UNITED STATES PATENT OFFICE.

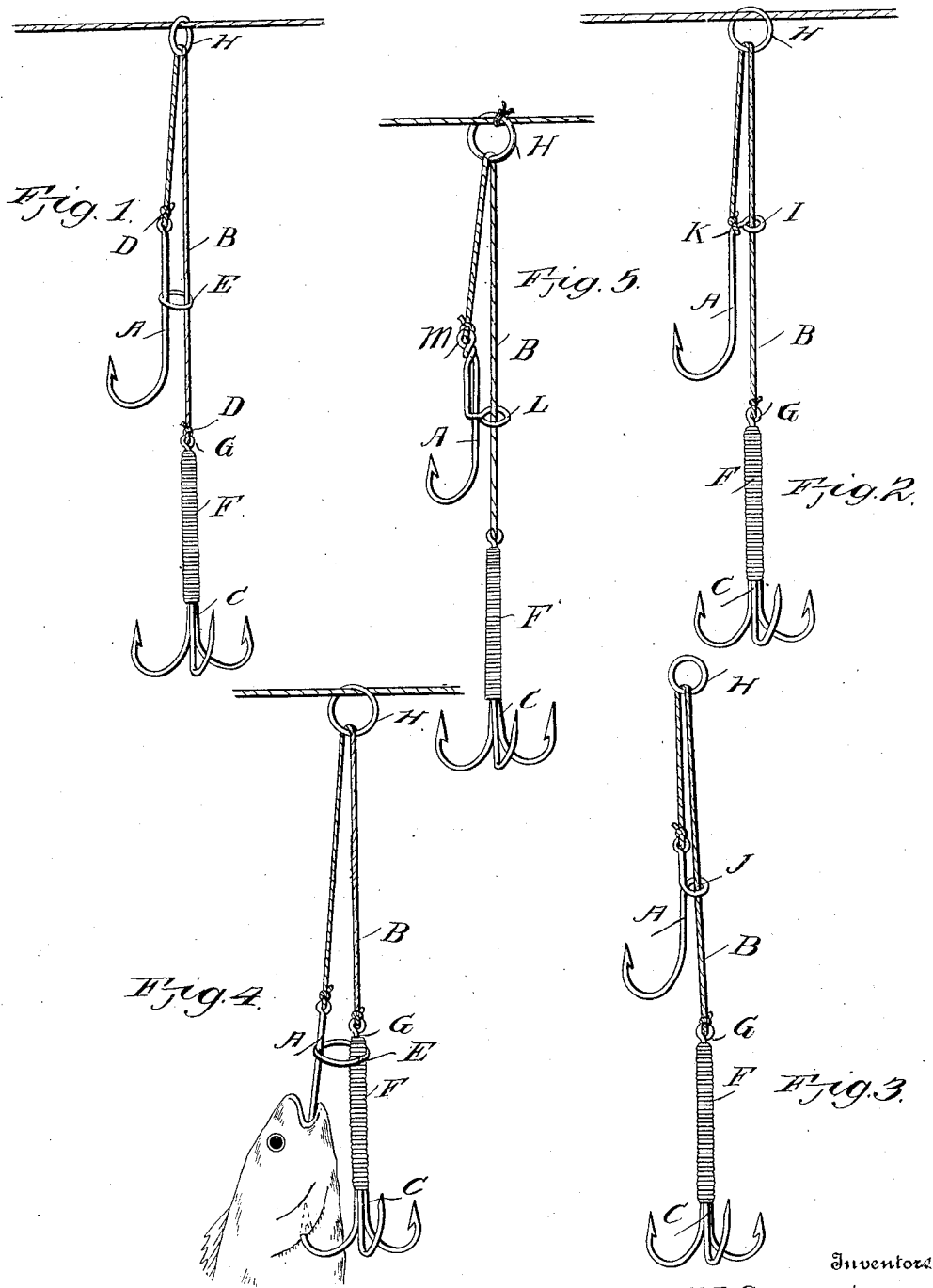

JOHN J. STROZIER AND FRANCIS MARION WILSON, OF WILLIS, TEXAS.

FISH-HOOK.

No. 829,302.  Specification of Letters Patent.  Patented Aug. 21, 1906.

Application filed September 19, 1905. Serial No. 279,164.

*To all whom it may concern:*

Be it known that we, JOHN J. STROZIER and FRANCIS MARION WILSON, citizens of the United States of America, residing at Willis, in the county of Montgomery and State of Texas, have invented new and useful Improvements in Fish-Hooks, of which the following is a specification.

Our invention relates to a fish-hook having a cluster of hooks attached which will work automatically and hook the fish and prevent the fish from getting away after it has been hooked, and which will operate to hook the fish more securely in proportion as the fish tries to free itself.

The main purpose of our invention is to provide a snag in proximity to a baited hook, whereby a pull on the baited hook will operate to throw the snag in motion, causing one of its points to catch in the fish's side.

A further purpose of our improved fish-hook is to provide a device of that character which will be especially applicable to trot-lines or to any other lines that are set and raised at periods.

Another purpose of our invention is to provide a fish-hook arrangement which by gravity will resume its set position in case the nibble on the baited hook is not sufficiently marked to move the snag the required distance.

As fish-hooks are made of various designs in accordance with the requirements of different localities we have made our device so that it can be formed from any variety of hooks.

The invention consists in the construction, combination, and arrangement of parts more fully hereinafter described, claimed, and illustrated in the accompanying drawings, which disclose the modified forms of our invention, and in which—

Figure 1 shows our invention fitted with an independent guide-ring welded to the hook. Fig. 2 shows the upper end of the bait-hook serving as the guiding means. Fig. 3 shows the guiding means made by a loop in the stem of the bait-hook. Fig. 4 is an illustration of our invention in operation with a movable rubber ring as the guiding means. Fig. 5 shows the stem of the hook twisted back upon itself and having its end bent and formed in an eye to serve as a guiding means for the hook.

Referring to the drawings by reference-letters, similar letters designate similar parts in the different views shown.

The letter A in Fig. 1 designates the bait-hook, that is connected with the snag C by the operating-cord B, which passes through the turning-ring H and is held to the snag and bait-hooks by knots, as shown at D. E is a guide-ring soldered to hook and serves to keep the bait-hook and snag in proper set position. By that we mean that it holds the bait-hook and snag vertical to each other and insures them a uniform motion, thus avoiding any dangling that would happen were they allowed free movement by the action of the water. The fixed guide-ring E may be supplemented by a movable ring, preferably of rubber, as shown by E of Fig. 4.

The snag C is made in one piece or of three or more hooks having their pointed ends extending outwardly and their stems bound together in any suitable manner, preferably wound by catgut, as shown at F. All the eye portions but one of the cluster-hooks which make up the snag are cut off, thereby permitting a tapering end, as at G, which gives a neat appearance and conforms to the corresponding end of the bait-hook A. The exposed eye at the end G is for tying one of the ends of the operating-cord B, as shown.

Fig. 2 is in all respects similar to Fig. 1, differing only in that where the latter is provided with a fixed and independent guiding-ring E the bait-hook in Fig. 2 has an enlarged eye portion, (designated by the letter I,) which it uses in lieu of the independent ring E, and has the operating-string B tied to it at the downward turning-point K.

Fig. 3 differs from the other views by having its guiding-ring formed by a loop in the stem of the bait-hook, as is shown at J, maintaining, as in Fig. 1, the manner in which it is fastened to the operating-string B—namely, that of being tied through the eye.

Fig. 5 is another modified form of our invention and shows the guiding-ring of the snag or grapple formed by the stem of the bait-hook making a turn at the eye M, the end portion being brought downwardly against the stem, thence bent at an angle and formed into the guide-ring, as shown at L.

From the foregoing description, taken in connection with the accompanying drawings, the construction of the invention will be understood without a further extended description. Changes in the form, proportion, and minor details of arrangement may be made within the scope of the invention without departing from or sacrificing any of the advantages.

Having thus described the invention, what we claim is—

1. In a device of the character set forth, a fish-hook, a cluster of hooks in proximity to the fish-hook, a supporting-ring, and a connecting-cord passing through the supporting-ring and doubled upon itself.

2. In combination with a hook, a cluster of hooks, a supporting-ring, a connecting-cord passing through the supporting-ring and doubled upon itself, and a guiding means for the connecting-cord.

3. In combination with a hook, a cluster of hooks, a supporting-ring, a connecting-cord passing through the supporting-ring and doubled upon itself, and a fixed or movable guiding means for the connecting-cord.

4. In combination with a hook, a cluster of hooks, a supporting-ring, a connecting-cord passing through the supporting-ring, and a loop in the stem of the hook to provide a guiding means for the connecting-cord.

In testimony whereof we affix our signatures in presence of two witnesses.

JOHN J. STROZIER.
FRANCIS MARION WILSON.

Witnesses:
SAMUEL A. CRAWFORD,
R. B. MOORING.